(12) United States Patent
Baumgart et al.

(10) Patent No.: US 10,344,349 B2
(45) Date of Patent: Jul. 9, 2019

(54) METHOD FOR TREATING SHEET METAL

(71) Applicant: GM GLOBAL TECHNOLOGY OPERATIONS LLC, Detroit, MI (US)

(72) Inventors: Hartmut Baumgart, Bischofsheim (DE); Ronald Sanders, Daxweiler (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 684 days.

(21) Appl. No.: 14/802,079

(22) Filed: Jul. 17, 2015

(65) Prior Publication Data

US 2016/0017457 A1 Jan. 21, 2016

(30) Foreign Application Priority Data

Jul. 18, 2014 (DE) .................. 10 2014 010 660

(51) Int. Cl.
*C21D 6/00* (2006.01)
*C21D 9/46* (2006.01)
(Continued)

(52) U.S. Cl.
CPC .............. *C21D 9/46* (2013.01); *B21C 37/02* (2013.01); *B62D 25/00* (2013.01); *B62D 29/007* (2013.01); *C21D 1/09* (2013.01); *C21D 1/34* (2013.01); *C21D 6/004* (2013.01); *C21D 6/005* (2013.01); *C21D 6/007* (2013.01); *C21D 6/008* (2013.01); *C22C 1/00* (2013.01); *C22C 21/14* (2013.01); *C22C 21/16* (2013.01); *C22C 21/18* (2013.01); *C22C 33/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01);
(Continued)

(58) Field of Classification Search
None
See application file for complete search history.

(56) References Cited

U.S. PATENT DOCUMENTS 3,717,442 A * 2/1973 Knopp ............... B22F 7/064
228/262.42
4,042,427 A 8/1977 Razim et al.
(Continued)

FOREIGN PATENT DOCUMENTS

DE 1925029 C3 6/1980
DE 19650258 A1 6/1998
(Continued)

OTHER PUBLICATIONS

Translation of DE 10 2012 102230 (published Sep. 2013) from Espacenet.*
(Continued)

*Primary Examiner* — George Wyszomierski
(74) *Attorney, Agent, or Firm* — Lorenz & Kopf LLP

(57) ABSTRACT

A method for treating sheet metal is disclosed. An amorphous mass containing an alloying element is applied onto a first area of a surface of the metal sheet. A second area of the surface is kept free of the amorphous mass. The amorphous mass and at least the first area of the metal sheet are heated in order to alloy the alloying element into the first area of the metal sheet while the second area remains unalloyed.

17 Claims, 3 Drawing Sheets

(51) Int. Cl.

| | | |
|---|---|---|
| *B62D 25/00* | (2006.01) | |
| *B62D 29/00* | (2006.01) | |
| *C21D 1/09* | (2006.01) | |
| *B21C 37/02* | (2006.01) | |
| *C21D 1/34* | (2006.01) | |
| *C22C 1/00* | (2006.01) | |
| *C22C 21/14* | (2006.01) | |
| *C22C 21/16* | (2006.01) | |
| *C22C 21/18* | (2006.01) | |
| *C22C 33/00* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/52* | (2006.01) | |
| *C22C 38/54* | (2006.01) | |
| *C22C 38/60* | (2006.01) | |
| *C22F 1/04* | (2006.01) | |

(52) U.S. Cl.
CPC .............. *C22C 38/50* (2013.01); *C22C 38/52* (2013.01); *C22C 38/54* (2013.01); *C22C 38/60* (2013.01); *C22F 1/04* (2013.01); *C21D 2221/00* (2013.01)

(56) References Cited

U.S. PATENT DOCUMENTS

| | | | | |
|---|---|---|---|---|
| 4,602,001 A | * | 7/1986 | Cyron | ................. B01D 53/865 502/439 |
| 5,735,163 A | | 4/1998 | Sato et al. | |
| 6,165,597 A | * | 12/2000 | Williams | ................. C23C 8/04 148/213 |
| 6,554,924 B2 | | 4/2003 | Morrow et al. | |
| 8,722,203 B2 | | 5/2014 | Laurent et al. | |
| 9,873,935 B2 | * | 1/2018 | Sanders | ................. C23C 10/28 |
| 2002/0092587 A1 | | 7/2002 | Morrow et al. | |
| 2006/0222880 A1 | | 10/2006 | Hanlon | |
| 2010/0007206 A1 | | 1/2010 | Wodrich | |
| 2014/0345753 A1 | | 11/2014 | Bors | |
| 2016/0017457 A1 | | 1/2016 | Baumgart et al. | |

FOREIGN PATENT DOCUMENTS

| | | | |
|---|---|---|---|
| DE | 10038139 A1 | | 2/2002 |
| DE | 102008003871 A1 | | 7/2009 |
| DE | 102009023195 A1 | | 12/2010 |
| DE | 102010035339 B4 | | 5/2012 |
| DE | 102009042387 B4 | | 1/2013 |
| DE | 10 2012 102230 A1 | * | 9/2013 |
| DE | 102013216317 A1 | | 2/2015 |
| EP | 0345936 A1 | | 12/1989 |
| JP | S53109882 A | | 9/1978 |
| JP | S5947372 A | | 3/1984 |
| JP | S62253778 A | | 11/1987 |
| JP | H01100710 A | | 4/1989 |
| JP | 2007116181 A | | 5/2007 |
| WO | 2015179747 A1 | | 11/2015 |

OTHER PUBLICATIONS

United States Patent Office, United States Office Action for U.S. Appl. No. 15/347,283, dated Apr. 25, 2017.

German Patent Office, German Search Report for German Application No. 102015014490.1, dated Nov. 23, 2016.

German Patent Office, German Search Report for German Application No. 102014010660.8, dated May 19, 2015.

* cited by examiner

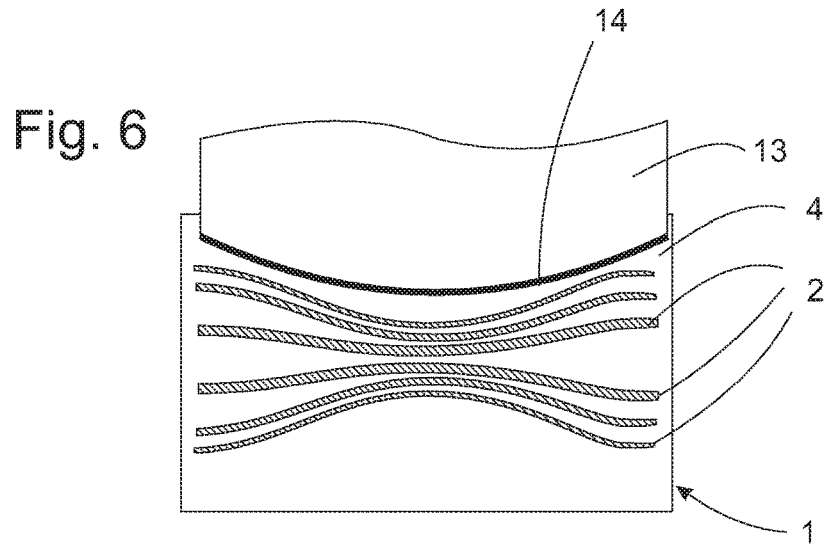
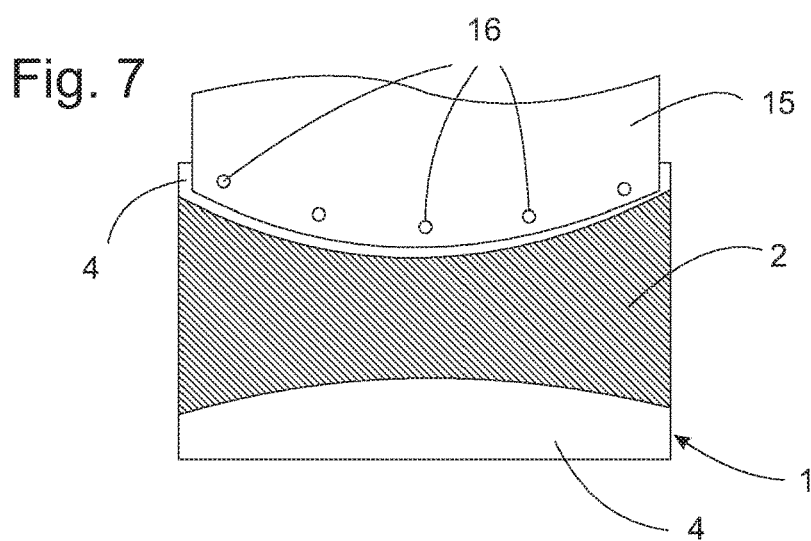
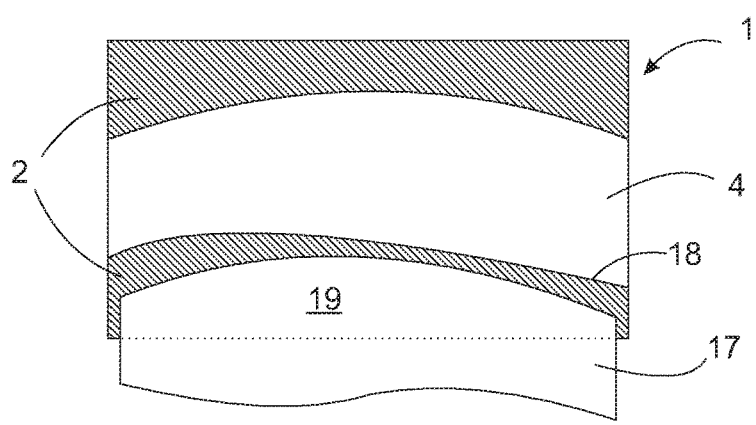

METHOD FOR TREATING SHEET METAL

CROSS-REFERENCE TO RELATED APPLICATION

This application claims priority to German Patent Application No. 102014010660.8, filed Jul. 18, 2014, which is incorporated herein by reference in its entirety.

TECHNICAL FIELD

The present disclosure pertains to a method for treating sheet metal, treated metal sheets, as well as products made thereof.

BACKGROUND

Methods for treating sheet metal with the objective of producing sheet metal parts, which in sections have locally modified properties, are generally known. Sheet metal parts with locally modified properties can be produced by locally alloying in corresponding alloying elements. For example, DE 196 50 258 A1 describes a method for laser-alloying metal parts, in which the alloying components are supplied in the form of rods or wires. This method is primarily suitable for alloying linear areas, but is not effective for uniformly alloying surface regions. Furthermore, the utilization of lasers is only economical for modifying smaller surface sections of a metal sheet or component, but is not effective for larger surface sections.

SUMMARY

In accordance with the present disclosure a cost-efficient method for treating sheet metal is provided, in which the shape of a sheet metal area, the properties of which are modified by the treatment, is not subject to any restrictions.

According to an embodiment of the present disclosure, a method for treating sheet metal includes applying an amorphous mass onto a first area of at least one surface of the metal sheet. The amorphous mass contains at least one alloying element. A second area of the surface is kept free of the amorphous mass. The amorphous mass may be applied by printing on the mass, particularly by means of gravure printing or screen printing, or by spraying on the mask.

The amorphous mass and at least the first area of the metal sheet are heated in order to alloy the alloying element into the first area of the metal sheet, while the second area remains unalloyed. The amorphous mass may be applied onto linear areas as well as surface regions, namely without any restrictions as to the shape of the sheet metal surface region covered by the amorphous mass. Consequently, the position, the size or the arrangement of the area alloyed after the heating process is not restricted in any way.

The heating process can be carried out after the amorphous mass has been applied onto the metal sheet. However, it would also be conceivable to apply the amorphous mass onto the already hot metal sheet. The heating process may be carried out by any suitable means. While a suitable healing process carried out with a laser is disclosed in DE 196 50 258 A1, it is easier to avoid local inhomogeneities of the alloying process if the heating process is realized by introducing the metal sheet and the amorphous mass into a furnace. In addition, the duration of the treatment furthermore is not dependent on the size of the area to be alloyed such that extensive alloyed areas can also be economically produced. The temperature during the alloying process should be lower than the inciting temperature of the metal sheet.

The treated metal sheet may be formed into a finished or semi-finished product. In order to save time, this step can be carried out in a cooling phase of the metal sheet that follows the alloying process. During the cooling phase, the metal sheet transfers its heat to a colder forming tool that is in contact with the metal sheet during the forming process.

The alloying element of the amorphous mass may be chosen such that the first area of the metal sheet is provided with a higher load characteristic than the unalloyed metal sheet or the second area that remains unalloyed. For example, the strength, the hardness or the moduli of elasticity are increased. The weldability of the metal sheet can be reduced in the first area due to the alloying process. Since the weldability in the second area is preserved, the partition of the metal sheet into first and second areas should be defined in such a way that all welded joints between the finished metal sheet and other components are in a finished product accommodated in the second area. This can occur, in particular, with steel sheets, to which carbon was added by alloying. Due to the lower hardness of the second area, it is also advantageous to localize connections to other components in the second area when other fastening techniques such as screws, rivets, crimping, etc., are used.

When the metal sheet includes a steel sheet, the alloying element may be selected from the group of elements consist of carbon, nitrogen, manganese, silicon, nickel, chrome or combinations thereof. The above-described adverse effect on the weldability can occur with a steel sheet, in particular, if the alloying element introduced with the amorphous mass includes carbon or increases the carbon equivalent. When the metal sheet includes an aluminum sheet, the alloying element may be selected from the group of elements consist of copper, zinc, magnesium, silicone, manganese, lithium or combinations thereof.

In a product that is assembled of several components, one of the components may include a metal sheet of the above-described type or a metal sheet treated in the above-described method and another component may include an attachment part that is fastened on the second area of the metal sheet. In this case, the superior welding properties of the second area can be advantageously utilized for producing welded joints and the greater ductility of the second area can be advantageously utilized in mechanical deformation-type joining methods.

The standard potential of the metal sheet can also be modified in the first area by alloying in the alloying element from the amorphous mass. In a product assembled of several components, this effect can be utilized in that the standard potential of the first area is approximated to or even matched with the standard potential of the attachment part by adding a suitable alloying element. In this way, the risk of contact corrosion can be minimized when the first area contacts the attachment part.

BRIEF DESCRIPTION OF THE DRAWINGS

The present disclosure will hereinafter be described in conjunction with the following drawing figures, wherein like numerals denote like elements.

FIG. 6 shows a top view of a product for a first exemplary embodiment;

FIG. 7 shows a top view of a product for a second exemplary embodiment, and

FIG. 8 shows a top view of a product for a third exemplary embodiment.

DETAILED DESCRIPTION

The following detailed description is merely exemplary in nature and is not intended to limit the invention or the application and uses of the invention. Furthermore, there is no intention to be bound by any theory presented in the preceding background of the present disclosure or the following detailed description.

Figure 1:
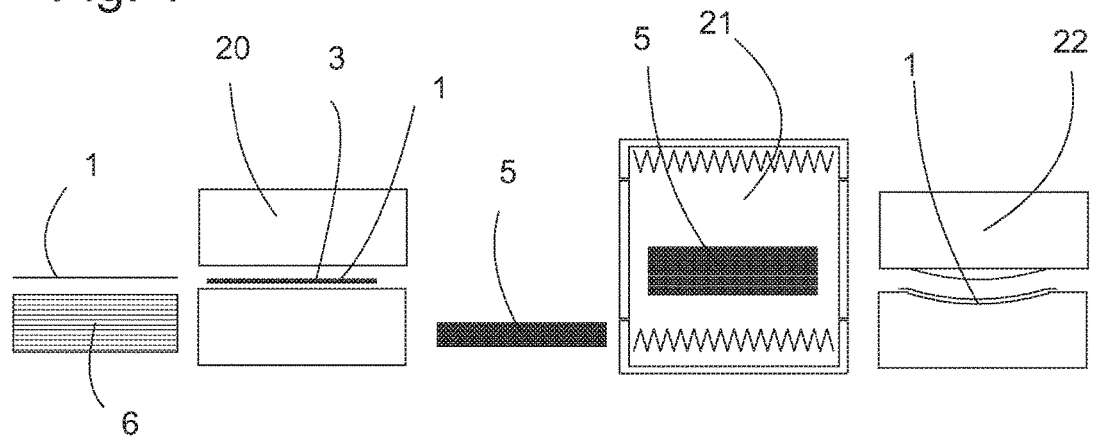
FIG. 1 shows the schematic sequence of the method for a first exemplary embodiment.

FIG. 1 schematically shows different stages of the inventive method. In a first stage, which is illustrated in the left portion of FIG. 1, metal sheets to be processed lie on a stack 6 in the form of a flat, plate-shaped sheet metal blank 1. The metal sheet 1 may be a low alloy steel, preferably IF-steel. Alternately, the metal sheet 1 may be a low alloy aluminum sheet, preferably of an alloy group 1xxx.

Figure 1A:
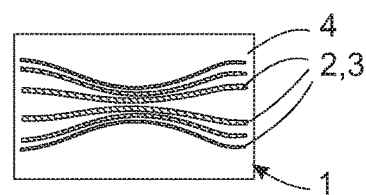
FIG. 1a shows a top view of the metal sheet for a first configuration.

In FIG. 1, a screen printing machine 20 is arranged on the right side adjacent to the sheet metal stack 6 and an individual sheet metal blank 1 from the stack 6 is inserted into the screen printing machine 20. An amorphous mass is applied onto a first area of a surface of each sheet metal blank 1 in this screen printing machine 20. The amorphous mass contains one or more alloying elements in the form of a powder suspended in a liquid that, if applicable, is mixed with a binder. When the metal sheet 1 is a steel sheet, the alloying element may consist, in particular, of carbon. However, nitrogen, manganese, silicone, chrome, nickel or a combination thereof with or without carbon may also be considered. When the metal sheet 1 is a low alloy aluminum, the alloying element may consist, in particular of copper, zinc, magnesium, silicone, manganese, lithium or a combination thereof. The particles of the powder may contain the alloying element in pure form or in the form of a compound that releases the alloying element under suitable external influences, particularly under the influence of heat. If several alloying elements are provided, the particles of the powder may consist of an alloy of the different alloying elements or the powder may consist of a mixture of particles that respectively contain one of the alloying elements. FIG. 1a shows the surface of the metal sheet 1 with the first area 2 that is covered by the amorphous mass 3 and a second area 4 that is kept free of the amorphous mass 3.

FIG. 1 shows a stack 5, on which the already printed sheet metal blanks 1 are deposited, on the right side adjacent to the screen printing machine. The stack 5 is subjected to a heat treatment in a top hat furnace 21 as illustrated in FIG. 1. The alloying element from the amorphous mass 3 is diffused into the first area 2 of the metal sheet in a diffusion annealing process. In this case, an alloy of the sheet metal material and the alloying elements contained in the mass 3 is produced in the first area 2 while the second area 4 remains unalloyed.

If possible, the time and the temperature of the diffusion annealing process are adjusted in such a way that complete diffusion of the alloying elements from the mass 3 into the metal sheet 1 is achieved.

If the printed sheet metal blanks 1 are stacked on the stack 5 before the amorphous mass 3 on their upper side has dried, the amorphous mass may be transferred from a blank 1 to the underside of a blank 1 stacked thereon and alloyed areas may also be formed on the underside of the blanks during the subsequent annealing process. If this is undesirable, the mass 3 can be dried before the blanks are stacked or the blanks 1 are individually transferred into the top hat furnace 21 in order to be subjected to the heat treatment.

If the metal sheet 1 consists of a steel material and the alloying element consists of carbon, then increased strength can be achieved in the alloyed first area 2 in dependence on the alloying composition by quenching the metal sheet after the diffusion annealing process. If applicable, the deformation properties can be improved by means of a subsequent tempering process. For this purpose, the stack 5 is conventionally quenched from the temperature of the diffusion annealing process. In a second stage of the heat treatment, the stack 5 is subjected to a tempering treatment in the top hat furnace 21. The choice of the quenching medium, the quenching conditions and the tempering conditions conventionally depend on the steel material and the properties to be achieved. A determination of the temperature and the duration of the heating and soaking phases depend on the dimensions of the stack 5 and the sheet metal thickness. In accordance with the base material and/or the applied alloying elements, the heat treatment preferably takes place under an inert gas atmosphere, for example nitrogen, in order to preclude undesirable reactions with atmospheric oxygen. A reducing atmosphere may also be considered, in particular, if the base material consists of aluminum.

On the right side, FIG. 1 shows a metal sheet 1 that is placed into a forming tool directly from the furnace heat and hot-formed therein. In this way, the pre-heating phase of the hot-forming process can be eliminated. After the heat treatment, the sheet metal blank 1 is cooled in the forming tool 22.

Figure 2:
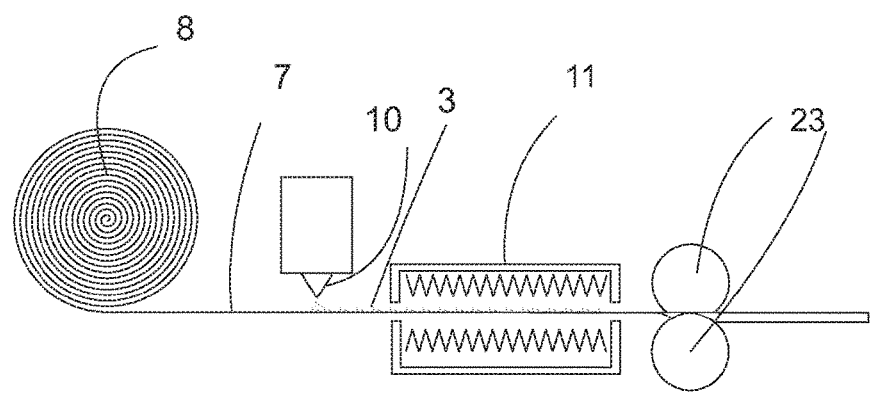
FIG. 2 shows the schematic sequence of the method for a second exemplary embodiment.

In a second exemplary embodiment illustrated in FIG. 2, the sheet metal to be processed is initially supplied in the form of a sheet metal strip 7, which is wound into a coil 8 as illustrated in the left portion of FIG. 2.

The sheet metal strip 7 is gradually unwound from the coil and passes one or more spray nozzles 10 that spray the amorphous mass 3 onto a first area 2 of the surface of the strip 7 while it passes underneath the nozzles 10. The nozzles 10 may be stationary or movable transverse to the transport direction of the sheet metal strip 7.

While spray nozzles 10 are generally shown, one skilled in the art will recognize that the spray nozzles may be replaced with one or more rolls. For example, the roll may feature conventional gravure printing recesses that are filled with the amorphous mass 3 applied onto the roll with the aid of a doctor blade while non-recessed surface regions of the roll do not contain the mass 3. The recesses are pre-formed in such a way that the mass 3 is transferred to the strip surface when it comes in contact with the strip 7 and the first area 2 is produced.

After the application of the amorphous mass 3 onto the sheet metal strip 7, it travels through a furnace 11, in which it is subjected to a heat treatment. During this process, the alloying element is diffused from the amorphous mass 3 into the first area 2 of the sheet metal 7. The heat treatment takes place under an inert gas atmosphere, for example nitrogen, in order to preclude undesirable reactions with atmospheric oxygen.

Downstream of the furnace 11, the sheet metal strip illustrated in FIG. 2 travels between profiled roll pairs 23 that form the still hot sheet metal strip 7 in a roll-forming process. The sheet metal strip 7 is incrementally formed to the desired final cross section in a plurality of profiled roll pairs 23, of which only one is schematically illustrated in FIG. 2. The sheet metal strip 7 is continuously cooled during this process. A roll-forming process is advantageous when greater lengths of a profile should be manufactured.

According to a third exemplary embodiment, the furnace 11 in FIG. 2 is replaced with a laser device. This is advantageous when the first area 2, onto which the amorphous mass 3 is applied, is relatively small or when a linear first area 2 should be produced. The mass 3 is alloyed in by purposefully heating the first area 2 with the laser beam. Due to the low heat input during the laser treatment, the subsequent forming process is carried out in the form of a cold-forming process. In this case, lower true strains and an increased strength can be achieved in the formed areas.

Figure 3:
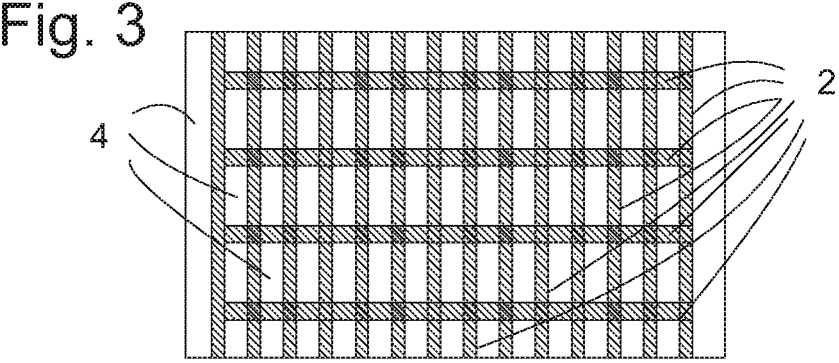
FIG. 3 shows a top view of the metal sheet for a second configuration.
Figure 4:
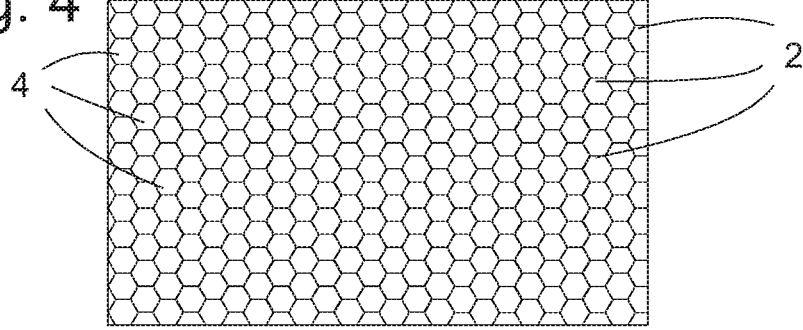
FIG. 4 shows a top view of the metal sheet for a third configuration.

In accordance with the method disclosed herein, it is possible to design the first area 2 with arbitrary geometry. For example, the strength and strain characteristics can be adapted to the requirements of a component by designing the first area accordingly. FIG. 1a shows a first area 2 that consists of several lines. The load characteristics can be purposefully adjusted with the shape, the width and the density of the lines. In this case, the lines may also extend parallel to one another or intersect one another as schematically illustrated in FIG. 3. The angle between the intersecting lines may be chosen arbitrarily. Other patterns consisting of hexagons as shown in FIG. 4, or alternately of circles or of arbitrary shapes (not shown) would also be conceivable.

Figures 5A, 5B:
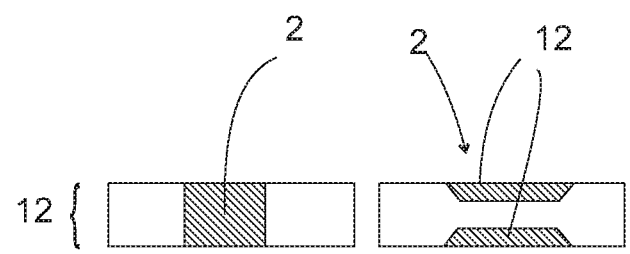
FIG. 5a shows a distribution of an alloying element through a cross section of the metal sheet.
FIG. 5b shows a distribution of an alloying element through a portion of a cross section of the metal sheet.

The alloying elements can be purposefully selected in order to modify certain properties of the sheet metal such as its load characteristic or standard potential in the alloyed first area 2. The distribution of the alloying elements over the thickness of the sheet metal in the first area 2 is dependent on the temperatures and the duration of the heat treatment. A uniform distribution of the alloying elements in the first area 2 originating from the amorphous mass 3 over the entire thickness of the metal sheet in accordance with FIG. 5a is particularly desirable if the property to be modified is a bulk property of the metal sheet such as, e.g., a load characteristic. In order to achieve such a uniform distribution, it may be helpful to apply the amorphous mass 3 onto both sides, if applicable, by stacking the sheet metal blanks 1 in the above-described fashion. A concentration of the alloying elements on a surface layer 12 on one or both sides of the first area 2 in accordance with FIG. 5b is advantageous when the property to be modified is a surface property such as, e.g., the standard potential.

FIG. 6 shows a product that includes the metal sheet 1 according to the first exemplary embodiment and an attachment part 13. In this example, the metal sheet 1 is a low alloy steel sheet, preferably of IF-steel, and the alloying element includes carbon. The attachment part 13 is welded to the second area 4 of the metal sheet 1 by means of a welding seam 14. In this case, it is advantageous that the carbon equivalent in the second area 4 is lower than in the first area 2 such that superior welding conditions exist in the second area 4. High load characteristics are simultaneously achieved in the first area 2 and provide the product as a whole with great strength.

FIG. 7 shows a product for a second exemplary embodiment that includes the metal sheet 1 and an attachment part 15. In this example, the strength is also increased in the first area 2 of the metal sheet 1 by means of an alloying element originating from the amorphous mass 3. This not only complicates a welding process, but also the use of the connecting techniques. Consequently, punch rivets 16 for connecting the metal sheet 1 to the attachment part 15 are positioned in the unalloyed second area 4 of the metal sheet 1, in which the ductility is higher and the cracking tendency during the punching process is lower than in the first area 2.

FIG. 8 shows a product for a third exemplary embodiment that includes the metal sheet 1 and an attachment part 17 bonded to the first area 2 of the metal sheet 1 in a contact area 19. It is presumed that galvanic contact between the metal sheet 1 and the attachment part 17 is locally produced in the contact area 19. In this example, the metal sheet 1 includes a low alloy steel sheet and the attachment part 17 includes a stainless steel part. The attachment part 17 has a higher standard potential than the second area 4 of the metal sheet. In order to approximate the standard potential of the first area 2 to the standard potential of the attachment part 17, chrome or chrome and/or nickel is alloyed into the first area 2. In this case, it suffices to increase the alloying concentration near the surface only as in FIG. 5b.

The approximation to the standard potential of the attachment part 17 in the first area 2 is particularly advantageous if the metal sheet 1 and the attachment part 17 are provided with a fill-surface coating. Since coating flaws particularly occur in the connecting area between the metal sheet 1 and the attachment part 17 that is usually difficult to access, differences in the standard potential frequently lead to corrosive damages in the connecting area. Such corrosive damages are prevented due to the approximation of the standard potentials. The boundary 18 between the first area 2 and the second area 4 of the metal sheet 1 should be positioned sufficiently far from the contact area 19 between the first area 2 and the attachment part 17 in order to be easily accessible and to allow the application of a flawless coating that prevents contact corrosion at this boundary 18. To this end, it is proposed, in particular, that the distance between the boundary 18 and the contact area 19 amounts to at least 50 mm over its entire length.

The metal sheet 1 may in all exemplary embodiments also consist of a blank of the sheet metal strip 7. The exemplary embodiments are not limited to the cited materials and alloying elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for treating sheet metal comprising:
   a) applying an amorphous mass onto a first area on a surface of a metal sheet that consists of a steel sheet such that a second area of the surface is kept free of the amorphous mass, wherein the amorphous mass includes at least one alloying element, and wherein the applying the amorphous mass comprises printing the amorphous mass onto the first area; and b) heating the amorphous mass and at least the first area on the surface of the metal sheet such that an alloying process is affected to alloy the alloying element into the first area while the second area remains unalloyed, wherein the temperature during the alloying process is lower than the melting temperature of the metal sheet.

2. The method according to claim 1, wherein the heating process is carried out after the application of the amorphous mass onto the metal sheet.

3. The method according to claim 1, wherein the heating process is carried out by introducing the metal sheet and the amorphous mass into a furnace.

4. The method according to claim 1, further comprising forming the metal sheet during a cooling phase of the metal sheet that follows the alloying process.

5. The method according to claim 4, wherein the metal sheet is cooled in contact with a forming tool.

6. The method according to claim 1, wherein the printing is performed by one of a gravure printing process, a screen printing process, or by spraying process.

7. The method according to claim 1, wherein the first area has a higher strength than the second area.

8. The method according to claim 7, wherein the alloying element is selected from the group consisting of carbon, nitrogen, manganese, silicon, nickel, chromium, or combinations thereof.

9. The method according to claim 7, further comprising coating the metal sheet at least along a boundary between the first area and the second area.

10. The method according to claim 1, further comprising fastening at least one attachment part to the second area of the metal sheet.

11. The method according to claim 10, wherein the first area has a higher strength than the second area.

12. The method according to claim 1, further comprising abutting at least one attachment part on the first area of the metal sheet, wherein a difference between the value of the standard potential of the second area and the standard potential of the attachment part is greater than a difference between the value of the standard potential of the first area and the standard potential of the attachment part.

13. The method according to claim 12, wherein the printing is performed by one of a gravure printing process, a screen printing process, or by spraying process.

14. The method according to claim 1, further comprising fastening at least one attachment part to the second area of the metal sheet and abutting the first area, wherein a difference between the value of the standard potential of the second area and the standard potential of the attachment part is greater than a difference between the value of the standard potential of the first area and the standard potential of the attachment part.

15. The method according to claim 14, wherein the printing is performed by one of a gravure printing process, a screen printing process, or by spraying process.

16. A method for treating sheet metal comprising:

applying an amorphous mass onto a first area on a surface of a metal sheet that consists of a steel sheet such that a second area of the surface is kept free of the amorphous mass, wherein the amorphous mass includes at least one alloying element;

heating the amorphous mass and at least the first area on the surface of the metal sheet such that an alloying process is affected to alloy the alloying element into the first area while the second area remains unalloyed; and abutting at least one attachment part on the first area of the metal sheet, wherein a difference between the value of the standard potential of the second area and the standard potential of the attachment part is greater than a difference between the value of the standard potential of the first area and the standard potential of the attachment part.

17. A method for treating sheet metal comprising:

applying an amorphous mass onto a first area on a surface of a metal sheet that consists of a steel sheet such that a second area of the surface is kept free of the amorphous mass, wherein the amorphous mass includes at least one alloying element;

heating the amorphous mass and at least the first area on the surface of the metal sheet such that an alloying process is affected to alloy the alloying element into the first area while the second area remains unalloyed; and fastening at least one attachment part to the second area of the metal sheet and abutting the first area, wherein a difference between the value of the standard potential of the second area and the standard potential of the attachment part is greater than a difference between the value of the standard potential of the first area and the standard potential of the attachment part.

* * * * *